United States Patent
Joshi et al.

(10) Patent No.: US 12,017,786 B2
(45) Date of Patent: Jun. 25, 2024

(54) AUXILIARY FAN BASED HYBRID COOLING SYSTEMS FOR ELECTRIC MACHINES

(71) Applicant: TOYOTA MOTOR ENGINEERING & MANUFACTURING NORTH AMERICA, INC., Plano, TX (US)

(72) Inventors: Shailesh N. Joshi, Ann Arbor, MI (US); Hiroshi Ukegawa, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 295 days.

(21) Appl. No.: 17/708,468

(22) Filed: Mar. 30, 2022

(65) Prior Publication Data

US 2023/0312123 A1  Oct. 5, 2023

(51) Int. Cl.
| | |
|---|---|
| *H02K 9/06* | (2006.01) |
| *B64D 27/24* | (2006.01) |
| *B64D 33/08* | (2006.01) |
| *H02K 5/20* | (2006.01) |
| *H02K 7/108* | (2006.01) |
| *H02K 11/25* | (2016.01) |

(Continued)

(52) U.S. Cl.
CPC .............. *B64D 33/08* (2013.01); *B64D 27/24* (2013.01); *H02K 5/207* (2021.01); *H02K 7/108* (2013.01); *H02K 9/06* (2013.01); *H02K 11/25* (2016.01); *H02K 11/33* (2016.01); *B64C 29/00* (2013.01)

(58) Field of Classification Search
CPC .. B64D 33/08; B64D 27/24; B64D 2033/024; B64D 29/00; H02K 5/207; H02K 7/108; H02K 9/06; H02K 11/25; H02K 11/33; H02K 2213/09; B64C 29/00; B64C 29/0016; B64U 10/20; B64U 20/94; B64U 50/13; B64U 50/23
See application file for complete search history.

(56) References Cited

U.S. PATENT DOCUMENTS

| | | | | |
|---|---|---|---|---|
| 6,700,235 B1 * | 3/2004 | McAfee | ................... | H02K 9/06 |
| | | | | 310/58 |
| 2008/0304986 A1 * | 12/2008 | Kenyon | ................... | F04D 25/08 |
| | | | | 417/423.12 |
| 2020/0346745 A1 | 11/2020 | Cai et al. | | |

FOREIGN PATENT DOCUMENTS

| | | | |
|---|---|---|---|
| KR | 101654505 B1 | 9/2016 | |
| KR | 20190135664 A * | 12/2019 | ........... F04D 25/163 |
| KR | 102267612 A | 6/2021 | |

(Continued)

*Primary Examiner* — Thomas Truong
(74) *Attorney, Agent, or Firm* — DINSMORE & SHOHL LLP

(57) ABSTRACT

An auxiliary fan based hybrid cooling system of an electric machine is contemplated. The hybrid cooling system comprises a propeller positioned on an exterior portion of an enclosure and mechanically coupled to a rotor, at least one electronic component, a stator, the rotor, and an auxiliary fan disposed within the enclosure, and wherein: in a single cooling mode, the propeller rotates to generate air that is channeled into the enclosure, in a dual cooling mode: the propeller rotates to generate the air that is channeled into the enclosure, a coupling mechanism simultaneously engages the rotor and the auxiliary fan and links the propeller to the auxiliary fan by the engaging of the rotor with the auxiliary fan, and the auxiliary fan, rotates responsive to the rotation of the propeller in the dual cooling mode.

20 Claims, 6 Drawing Sheets

(51) Int. Cl.
*H02K 11/33* (2016.01)
*B64C 29/00* (2006.01)

(56) References Cited

FOREIGN PATENT DOCUMENTS

| KR | 102321352 | B1 | 11/2021 |
| WO | 2016172947 | A1 | 11/2016 |

* cited by examiner

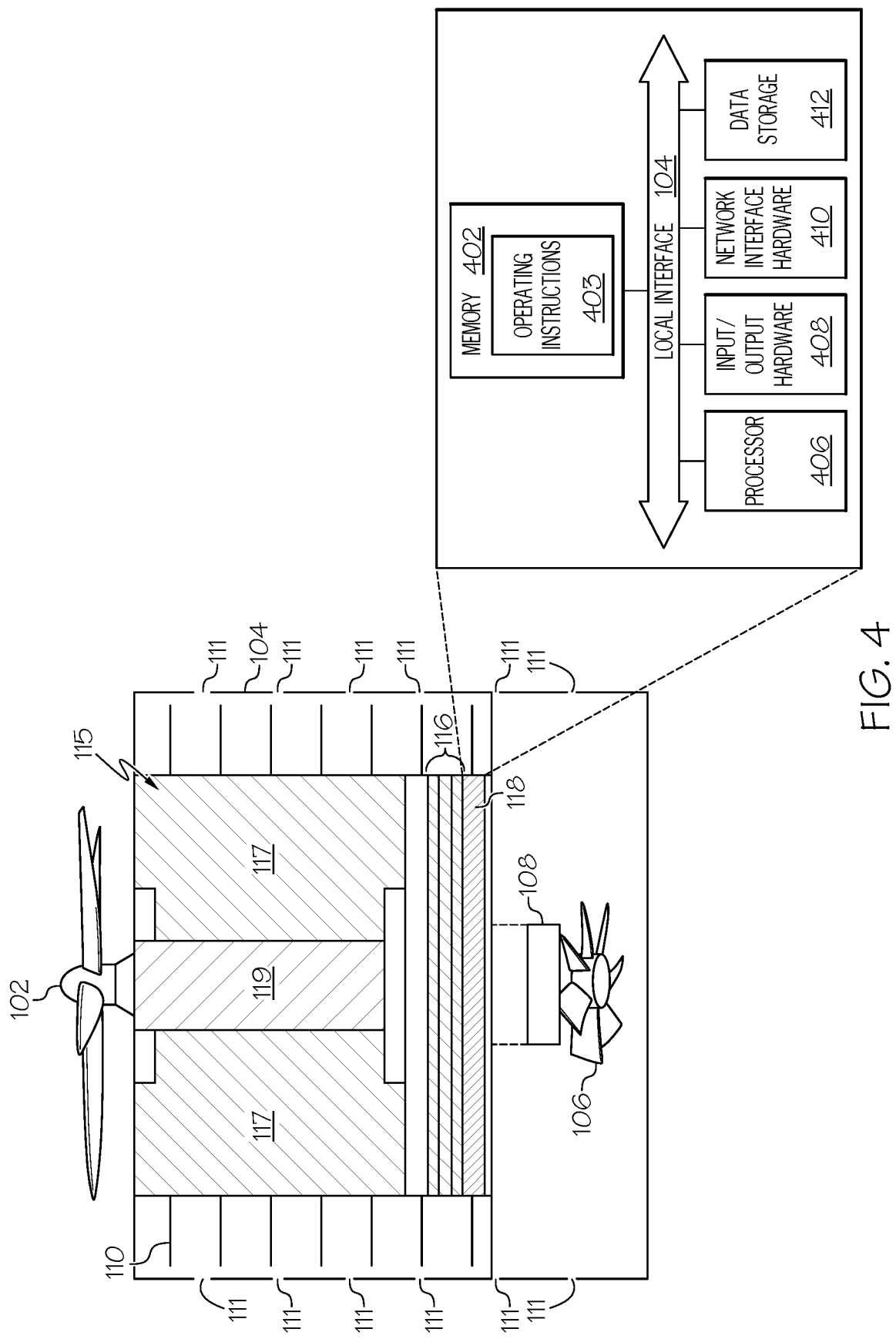

AUXILIARY FAN BASED HYBRID COOLING SYSTEMS FOR ELECTRIC MACHINES

TECHNICAL FIELD

The embodiments described herein generally relate to a hybrid cooling system, and in particular, to an auxiliary fan based hybrid cooling system in which the auxiliary fans of electric machines are operable concurrently and in conjunction with propellers of the electric machines to cool various components of these machines.

BACKGROUND

Electric vertical take-off and landing (eVTOL) vehicles may take off from a source location, e.g., cargo in the form of purchased goods, for delivery to a location, travel a certain distance in the air, drop off the cargo, and return to the destination location. Operation of eVTOL vehicles, however, suffer from deficiencies. For example, during take-off and landing operations, components included within the eVTOL vehicles may experience sudden increases in operating temperatures due to increased power demands, which adversely impact the operational life of these components, and by extension, the operational life of eVTOL vehicles.

Accordingly, a need exists for alternative cooling systems that cools the stator, motor, and various components of the eVTOL vehicles during specific vehicle operating conditions, e.g., take-off, landing, hovering, cruising, and so forth.

SUMMARY

In one embodiment, an auxiliary hybrid cooling system of an electronic machine is provided. The hybrid cooling system comprises a propeller positioned on an exterior portion of an enclosure and mechanically coupled to a rotor, at least one electronic component, a stator, the rotor, and an auxiliary fan disposed within the enclosure, and wherein: in a single cooling mode, the propeller rotates to generate air that is channeled into the enclosure, in a dual cooling mode: the propeller rotates to generate the air that is channeled into the enclosure, a coupling mechanism simultaneously engages the rotor and the auxiliary fan and links the propeller to the auxiliary fan by the engaging of the rotor with the auxiliary fan, and the auxiliary fan, rotates responsive to the rotation of the propeller in the dual cooling mode.

In another embodiment, another hybrid cooling system of an electric machine is provided. The hybrid cooling system comprises a propeller positioned on an exterior portion of an enclosure and mechanically coupled to a rotor, at least one electronic component, a stator, the rotor, and an auxiliary fan disposed within the enclosure, and wherein in a dual cooling mode the propeller rotates to generate the air that is channeled into the enclosure, a coupling mechanism simultaneously engages the rotor and the auxiliary fan and links the propeller to the auxiliary fan by the engaging of the rotor with the auxiliary fan, and the auxiliary fan, rotates responsive to the rotation of the propeller in the dual cooling mode.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts a non-limiting example of a controller that is configured to perform one or more of the features and functionalities described in the present disclosure, according to one or more embodiments described and illustrated herein.

DETAILED DESCRIPTION

Electric vertical take-off and landing vehicles may provide a way of delivering goods to various locations in a cost and energy efficient manner. However, as stated above, eVTOL vehicles suffer from a deficiency. During specific operation conditions such as, e.g., take-off, landing, and hovering, the operating temperatures of the components within eVTOL vehicles may exceed threshold operational temperatures, namely threshold operational temperatures that are considered suitable for ensuring long operational life for these components.

The embodiments described herein address and overcome the above described deficiency. In particular, the embodiments of the present disclosure describe a hybrid cooling system of an electric machine (e.g., an eVTOL vehicle) that utilizes multiple distinct cooling modes to cool the components of the eVTOL vehicle. During operating conditions such as take-off, landing, and hovering conditions, the high density operations of various components (e.g., power electronics components of inverter circuits and/or batteries) of the eVTOL vehicle may cause sudden increases in the operating temperatures of these components. To reduce such temperatures, the eVTOL vehicles of the present disclosure may operate in a dual cooling mode, in which both a propeller and an auxiliary fan operate concurrently and in conjunction with each other to generate air for cooling. In particular, the combined air generated by the auxiliary fan and the propeller ensures that the operating temperatures of various components of the eVTOL vehicle, e.g., stators, rotors, power electronics devices, controllers, and so forth, are maintained within a threshold temperature or threshold temperature range. On the other hand, at times when the operating temperatures of these components is low (e.g., when the eVTOL is airborne and cruising at an altitude for a particular time frame), the eVTOL vehicle may operate in a single cooling mode, in which the auxiliary fan is inactive and only the propeller 102 of the eVTOL vehicle rotates to generate air for cooling the various components.

It is noted that although the embodiments described herein are directed to and relate broadly to eVTOL vehicles, these embodiments are not limited thereto. The embodiments described herein may be applicable to electric motors that are included in a variety of machines, e.g., automobiles, machines that are capable of traveling on land, water, and/or air, and any combination thereof. It is noted that the embodiments described herein may be employed in any machine in which there is a transitory increase in electric power.

Figure 1:
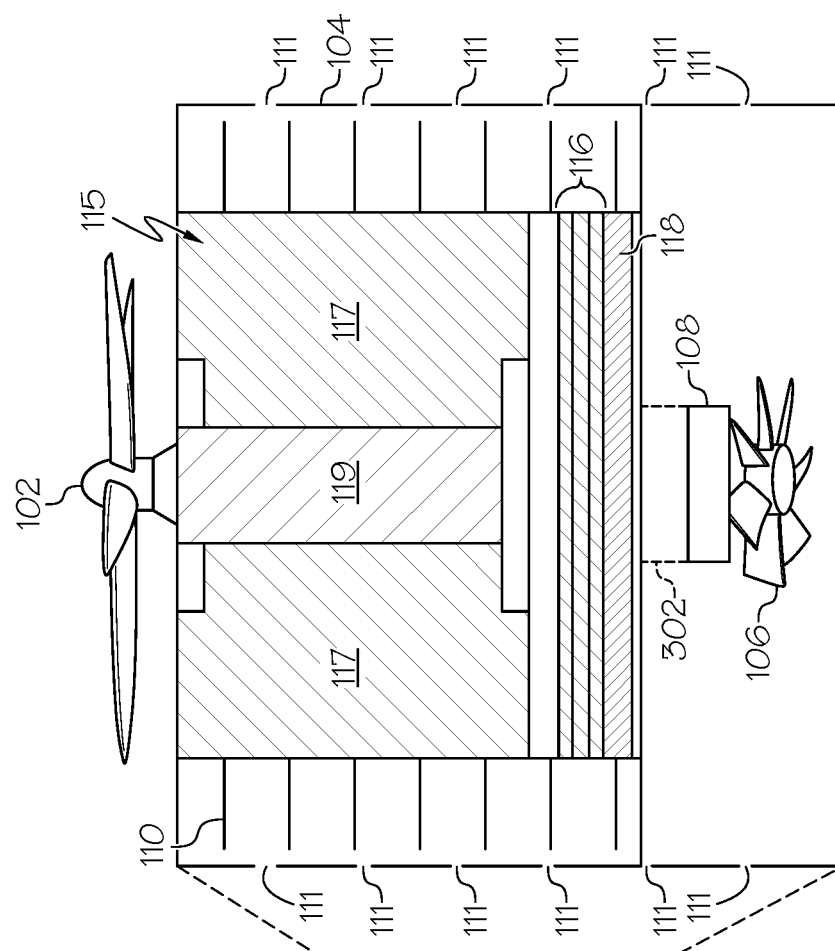
FIG. 1 depicts an example implementation of an auxiliary fan based hybrid cooling system included as part of an eVTOL vehicle, according to one or more embodiments described and illustrated herein.
Figure 1:
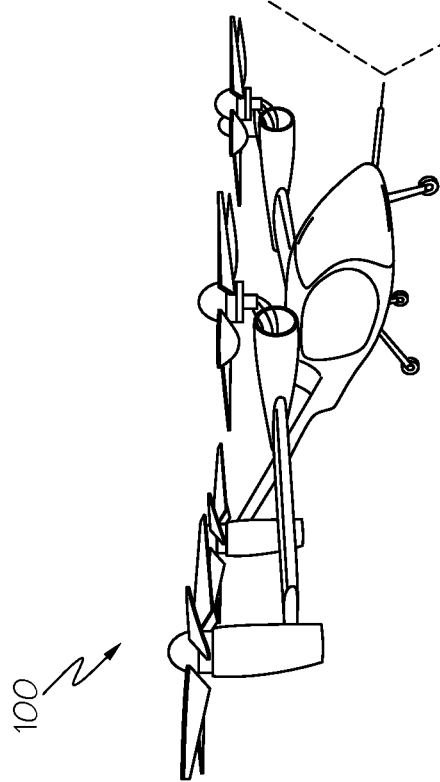

FIG. 1 depicts an example implementation of an auxiliary fan based hybrid cooling system included as part of an eVTOL vehicle 100, according to one or more embodiments described and illustrated herein. An eVTOL vehicle 100 refers to an aircraft that is capable of traveling in the air, or in the air and on land, using primarily or exclusively electric power. In embodiments, the eVTOL vehicle 100 may include a plurality of propellers positioned on wings that protrude from the sides and a rear portion of the vehicle. The eVTOL vehicle 100 also includes an electric motor assembly 115 that comprises a stator 117, a rotor 119, and at least one electronic component (e.g., a power electronics device or a plurality of power electronics devices 116), and a controller 118 (e.g., a computing device). In embodiments, as illustrated in FIG. 1, the eVTOL vehicle 100 may include a propeller 102 that is disposed or positioned on a top portion of a rotor 119 that is disposed at least partially within an enclosure 104, and an auxiliary fan 106 that is positioned within the enclosure 104. The electric motor assembly 115 may also include fins 110 for additional cooling. Inlets 111 may be provided on the enclosure 104 for air generated by rotation of the propeller 102 and the auxiliary fan 106 to be channeled in the enclosure 104 for cooling the stator, rotor, the power electronics devices 116, and/or the controller 118. In embodiments, the eVTOL may also include a coupling mechanism 108 that is disposed within the enclosure 104 and serves to, under particular operating conditions of the eVTOL vehicle 100, mechanically couple the propeller 102 with the rotor 119, which is also coupled to the auxiliary fan 106. In embodiments, the hybrid cooling system as described in the present disclosure may facilitate operation of the eVTOL vehicle 100 in two distinct modes—single cooling mode and dual cooling mode.

In the single cooling mode, which may occur at times of lower power demand such as cruising, the propeller 102 may rotate at a particular speed and generate air that may pass over the fins 110 for cooling of the various components of the eVTOL vehicle 100, namely the stator 117, the rotor 119, and power electronics devices 116. In this mode, the auxiliary fan 106 may remain inactive and the air utilized for cooling the rotor 119, the stator 117, and the power electronics devices 116, and so forth, may be based solely on rotation of the propeller 102. In the single cooling mode, the auxiliary fan 106 is decoupled from the rotor 119. It is noted that a portion of the rotor 119 is connectable with the propeller 102 and another portion of the rotor 119 is connectable with the coupling mechanism 108, which in turn is connected to the auxiliary fan 106. Any decoupling of the rotor 119 from the propeller 102, in effect, decouples and separates movement of the auxiliary fan 106 from that of the propeller 102. In embodiments, in the single cooling mode, the auxiliary fan 106, operating independent of the movement of the propeller 102, may utilize the air generated by the rotation of the propeller 102 to generate electricity, which in turn may be utilized to power one or more of the power electronics devices 116.

In the dual cooling mode, which may occur at times of higher power demand such as lift off, landing, and hovering, air for cooling the various components of the eVTOL may be generated by both the propeller 102 and the auxiliary fan 106. In particular, in the dual cooling mode, the controller 118 may facilitate engagement of the rotor 119 with the auxiliary fan 106, which in turn couples the rotation of the propeller 102 with that of the auxiliary fan 106. In embodiments, the coupling mechanism 108 may be a clutch. It is noted that the dimensions of the propeller 102 may vary from those of the auxiliary fan 106, as described in greater detail below.

Figure 2A:
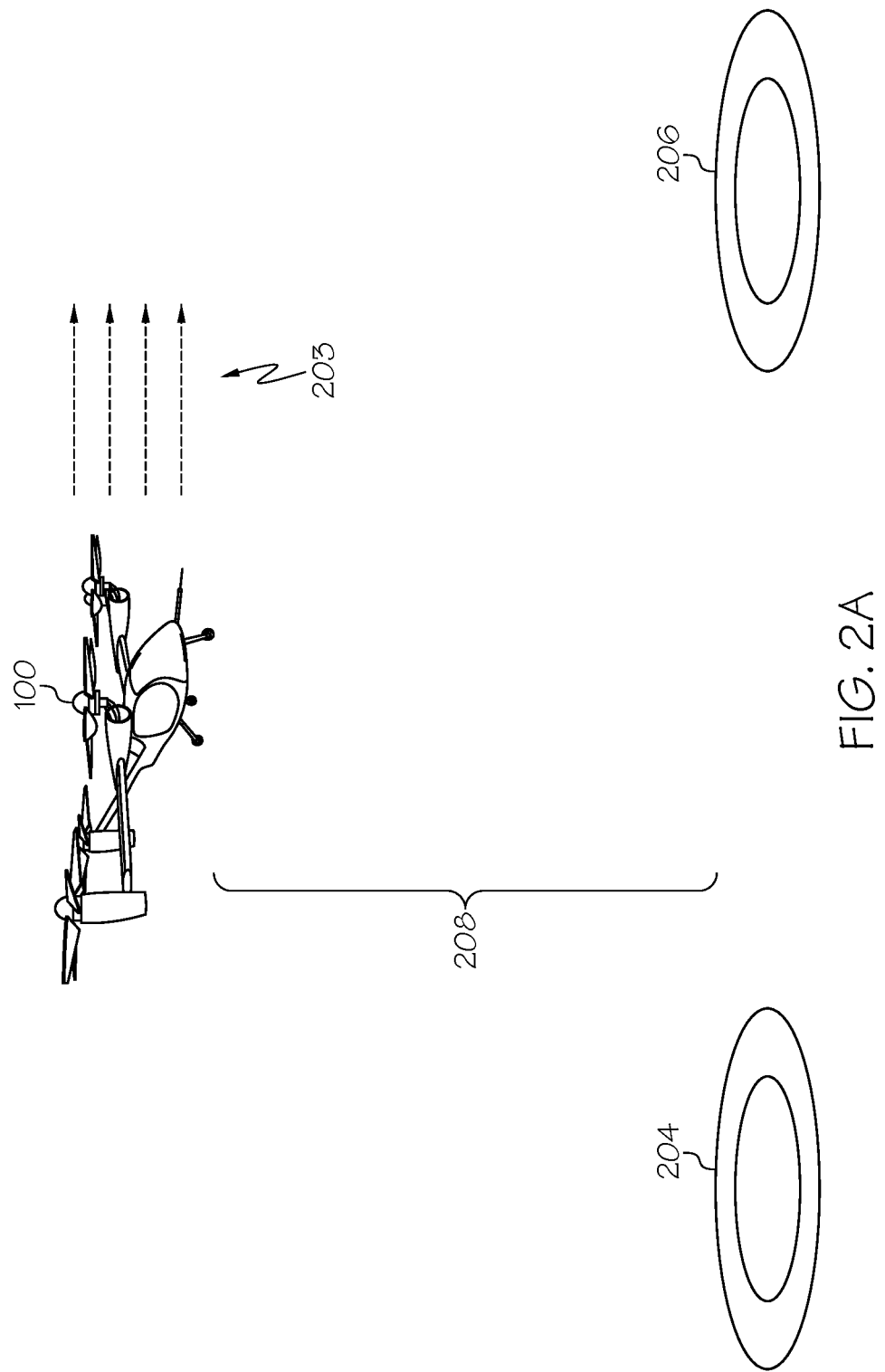
FIG. 2A depicts an example operation of an eVTOL vehicle in a cruise mode, according to one or more embodiments described and illustrated herein.

FIG. 2A depicts an example operation of an eVTOL vehicle 100 operating in a cruise mode 203, according to one or more embodiments described and illustrated herein. For example, FIG. 2A illustrates an eVTOL vehicle 100 that takes off from a source location 204, e.g., a landing area outside a warehouse or distribution center, etc. After takeoff, the eVTOL may remain airborne for a certain period of time, and travel to a destination location 206. In embodiments, the cruise mode 203 may be automatically initiated when the controller 118 of the eVTOL vehicle 100 determines that various components of the eVTOL vehicle 100 satisfy particular operating conditions.

In particular, the controller 118 may determine whether the eVTOL vehicle 100 has been traveling at a particular threshold altitude 208 for a predetermined time frame, in addition to determine whether the eVTOL vehicle 100 has been traveling at a constant speed for a predetermined time frame. It is also noted that controller 118 is also configured to determine, in real time, the temperatures of and power drawn by each of the various components of the eVTOL vehicle 100. Based on these conditions, the controller 118 may activate, automatically and without user intervention, operation of the eVTOL vehicle 100 in the cruise mode 203. Alternatively, the controller 118, upon determining that the eVTOL vehicle 100 has reached a particular altitude (e.g., 1000 feet-1500 feet), may automatically activate the cruise mode 203.

In embodiments, the controller 118 may activate the cruise mode 203 based solely on the amount of time that the eVTOL vehicle 100 has been traveling at a particular altitude, even if the eVTOL vehicle 100 travels at varying speeds. In embodiments, the controller 118 may activate the cruise mode 203 when the eVTOL is determined to be traveling at a constant speed for a predetermined period of time, irrespective of the altitude at which the eVTOL vehicle 100 may be traveling. In other embodiments, the controller 118 may activate the cruise mode 203 upon determining that the propeller 102 has been rotating at a threshold rotations per minute ("rpm") for a predetermined time frame. In embodiments, any permutation or combination of the above described conditions may be utilized by the controller 118 to activate the cruise mode 203. Upon activation of the cruise mode 203, the controller 118 may also activate a single cooling mode (concurrently or sequentially), in which the rotation of the propeller 102 may be the primary or solitary component utilized for cooling the various components of the eVTOL.

Figure 2B:
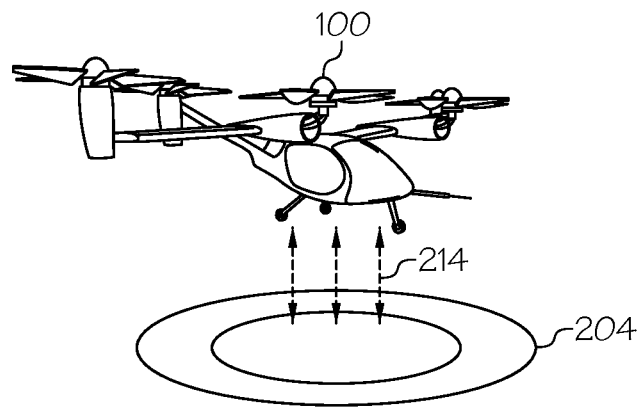
FIG. 2B depicts an example operation of the eVTOL vehicle in a hovering mode, according to one or more embodiments described and illustrated herein.

FIG. 2B depicts an example operation of the eVTOL vehicle 100 in a hovering mode 214, according to one or more embodiments described and illustrated herein. In particular, the controller 118 may automatically trigger the hovering mode 214 for the eVTOL vehicle 100 upon determining, e.g., that the eVTOL vehicle 100 is within a particular geographic radius or distance of the destination location 206, e.g., a location where the eVTOL vehicle 100 may be configured to deliver a package. For example, if the eVTOL vehicle 100 is within 20 feet from the destination location 206 and is traveling at an altitude of 20 feet directly over a landing area associated with the destination location 206, the controller 118 may automatically activate the hovering mode 214, e.g., for facilitating an accurate landing and offloading or delivery of goods. In response, the eVTOL vehicle 100 may sarret lateral or diagonal movement of the eVTOL vehicle 100 in excess of a threshold amount (e.g., 1-3 feet) and ensure that the vehicle maintains its position at a particular altitude, e.g., 20 feet from the landing area for a predetermined time frame.

In embodiments, the eVTOL vehicle 100 may be in the hovering mode 214 for various reasons, e.g., until other vehicles, obstructions, individuals, and so forth, are cleared from the landing area. In other embodiments, the eVTOL vehicle 100 may be manually controlled such that upon receiving instructions from an external device such as a remote control device (not shown) operated by an individual, the eVTOL vehicle 100 may enter a hovering mode 214. In other embodiments, the presence of particular operating conditions of the eVTOL vehicle 100 may automatically trigger the hovering mode 214 of the eVTOL vehicle 100. For example, if the eVTOL vehicle 100 is operated manually, and the controller 118 determines that the vehicle has been airborne, is positioned at a particular altitude, and fails to deviate in any particular direction (e.g., vertically, horizontally, or diagonally) in excess of a specific magnitude for a predetermined time frame, the controller 118 may trigger activation of the hovering mode 214. Alternatively, the controller 118 may associate such conditions with the eVTOL vehicle 100 operating in the hovering mode 214.

In the hovering mode 214, the operating temperatures of the stator, rotor, power electronics devices 116, and the controller 118 are higher than when the eVTOL vehicle 100 is operating in the cruise mode 203. As such, the controller 118 may, automatically and without user intervention, activate operation of the eVTOL vehicle 100 in a dual cooling mode for reducing or maintaining the operating temperatures of the stator, rotor, and the power electronics devices 116 to within a particular temperature threshold or temperature threshold range. In embodiments, in the dual cooling mode, air that is generated by the concurrent rotation of both the propeller 102 and the auxiliary fan 106 reduces operating temperatures of the stator, rotor, and the power electronics devices 116. In embodiments, the air generated by the propeller 102 and the auxiliary fan 106 is channeled into the enclosure 104 via the inlets 111 disposed on exterior portions of the enclosure 104. Additionally, it is noted that a plurality of temperature sensors may be included as part of the eVTOL vehicle 100, e.g., within the enclosure 104 and within a particular proximity of each of the stator 117, the rotor 119, and the power electronics devices 116. In embodiments, a plurality of power sensors, e.g., current sensors, may also be positioned in the enclosure 104, e.g., within a proximity of each of the stator 117, the rotor 119, and the power electronics devices 116.

Figure 2C:
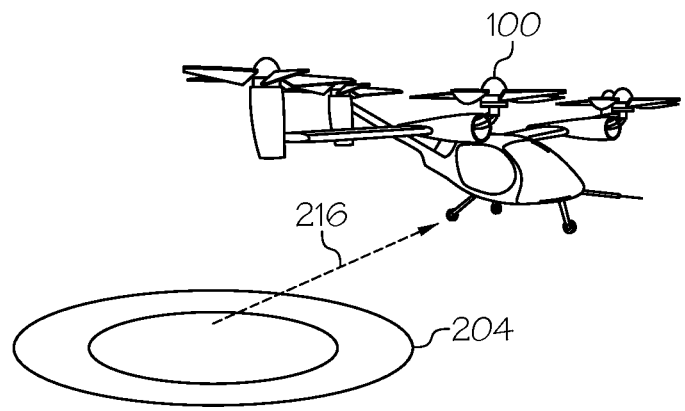
FIG. 2C depicts the eVTOL vehicle during take-off, according to one or more embodiments described and illustrated herein.

FIG. 2C depicts the eVTOL vehicle 100 during a take-off operating, according to one or more embodiments described and illustrated herein. As illustrated, as part of the take-off operation, the eVTOL vehicle 100 may follow an upward diagonal trajectory 216 from the source location 204 and maintain this trajectory for a predetermined time frame, e.g., for 10 minutes or an amount of time that it may take for the eVTOL vehicle 100 to reach a particular altitude (e.g., 500-1000 feet). During takeoff, the propeller 102 may require a particular length of time to reach a threshold rotations per minute, during which the operating temperatures of stator, rotor, and the power electronics devices 116 may exceed a threshold temperature or threshold temperature range that is beyond a operating temperature range for these components. As such, to reduce the operating temperatures of the power electronics devices 116, the stator 117, and the rotor 119, the controller 118 may activate the dual cooling mode, in which, as stated above, the propeller 102 may be mechanically coupled with the auxiliary fan 106. In particular, during the time that it takes for the propeller 102 to reach a threshold rotations per minute, the auxiliary fan 106 may generate the requisite air to cool the components of the eVTOL vehicle 100.

Figure 2D:
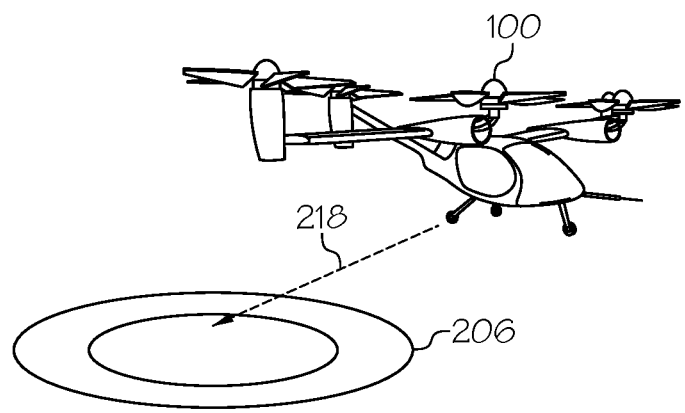
FIG. 2D depicts the eVTOL vehicle during landing, according to one or more embodiments described and illustrated herein.

FIG. 2D depicts the eVTOL vehicle 100 during landing, according to one or more embodiments described and illustrated herein. As illustrated, as part of the landing operation, the eVTOL vehicle 100 may follow a downward trajectory 218 towards a destination location 206 and maintain this trajectory for a predetermined time frame, e.g., an amount of time that it takes for the eVTOL vehicle 100 to land onto the landing area at the destination location 206. During the landing operation, the propeller 102 may reduce the rotation speed of the blades of the propeller 102 in order to reduce the traveling speed of the eVTOL vehicle 100, as a result of which the amount of air generated by the propeller 102 may be reduced. Concurrently, during the landing operation, the operating temperatures of the stator 117, rotor 119, and power electronics devices 116 may increase significantly, e.g., beyond threshold operating temperatures. In order to reduce the operating temperatures of these components, the controller 118 may initiate operation of the eVTOL vehicle 100 in the dual cooling mode. In particular, during the time that the propeller 102 reduces its speed of rotation to facilitate landing of the eVTOL vehicle 100 at the destination location 206, the auxiliary fan 106, during the dual cooling mode, engages with or mechanically couples with the propeller 102 and begins rotating at a particular rotations per minute in order to generate air to cool the stator, rotor, the power electronics devices 116, and the controller 118. In this way, the eVTOL vehicle 100 operating in the dual cooling mode ensures that operating temperatures of the stator 117, rotor 119, power electronics devices 116, and the controller 118 are maintained within threshold temperature or temperature threshold ranges.

Figure 3A:
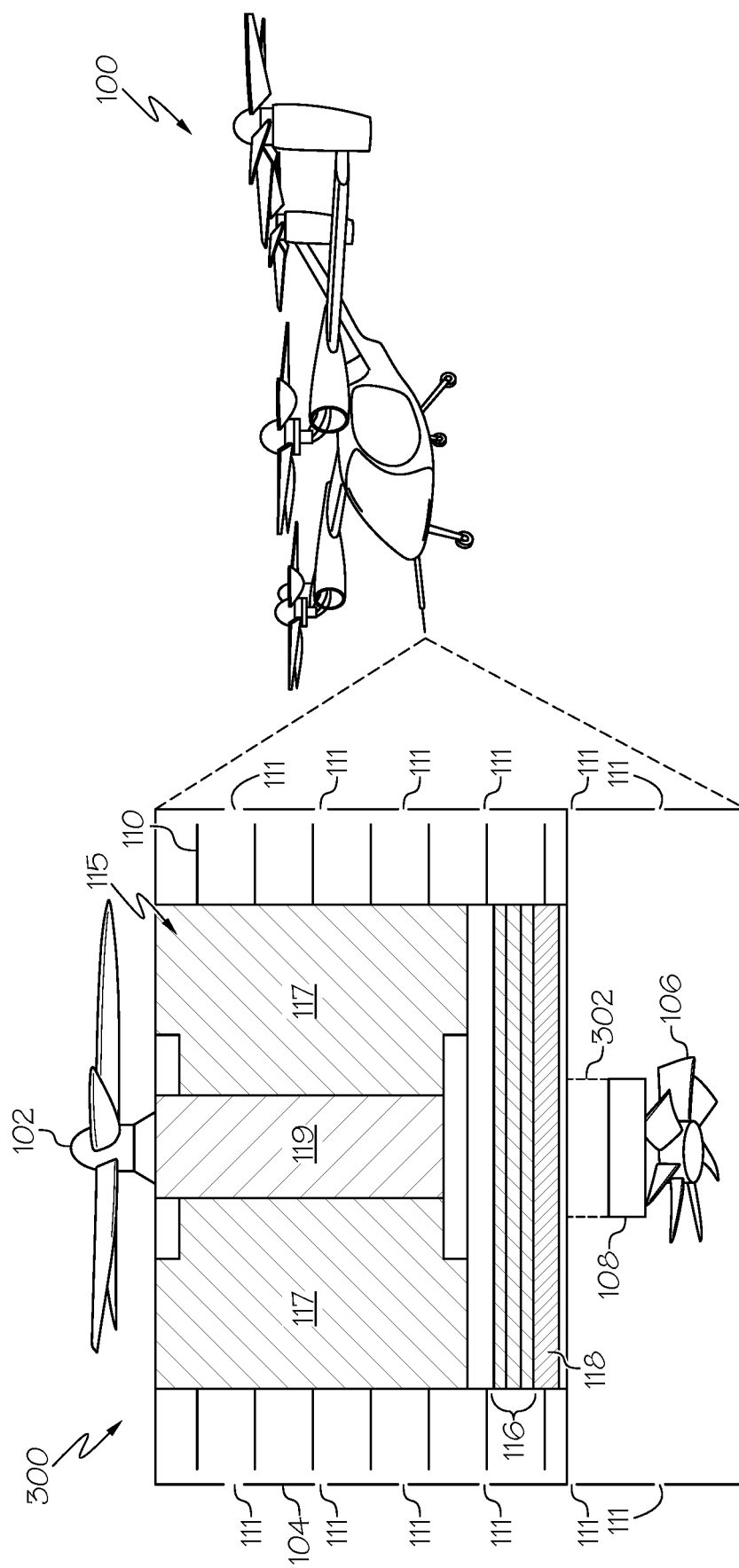
FIG. 3A depicts an example operation of the propeller and auxiliary fan of an eVTOL vehicle operating in a single cooling mode, according to one or more embodiments described and illustrated herein.

FIG. 3A depicts an example operation of the eVTOL vehicle 100 in a cruising mode, according to one or more embodiments described and illustrated herein. In particular, the eVTOL vehicle 200 operating in the cruise mode 203, as described above, may be when the eVTOL vehicle 200 has been airborne for a particular amount of time, e.g., anywhere between 2 minutes to 20 minutes or longer, and may be traveling at a particular altitude for a predetermined time frame. Moreover, in the cruise mode 203, the eVTOL vehicle 100 may be traveling at a predefined speed for a particular period of time, e.g., for the majority of the time that the eVTOL vehicle 100 has been airborne. For this time, the propeller 102 may be rotating at a consistent speed, e.g., 1500-2500 rotations per minute, which generates air for cooling each of the power electronics devices 116, the stator 117, the rotor 119, and the controller 118 (e.g., a computing device). It is noted that, when operating in the eVTOL vehicle 100 is in a single cooling mode, the controller 118 may initiate operation of the auxiliary fan 106 such that the auxiliary fan 106 operates as a turbine. In particular, in operation, the auxiliary fan 106 may rotate at a particular speed and utilize the air generated by the propeller 102 to generate electricity, which in turn may be utilized to power operation of various components within the eVTOL, e.g., one or more of the power electronics devices 116, the controller 118, battery, and so forth.

Figure 3B:
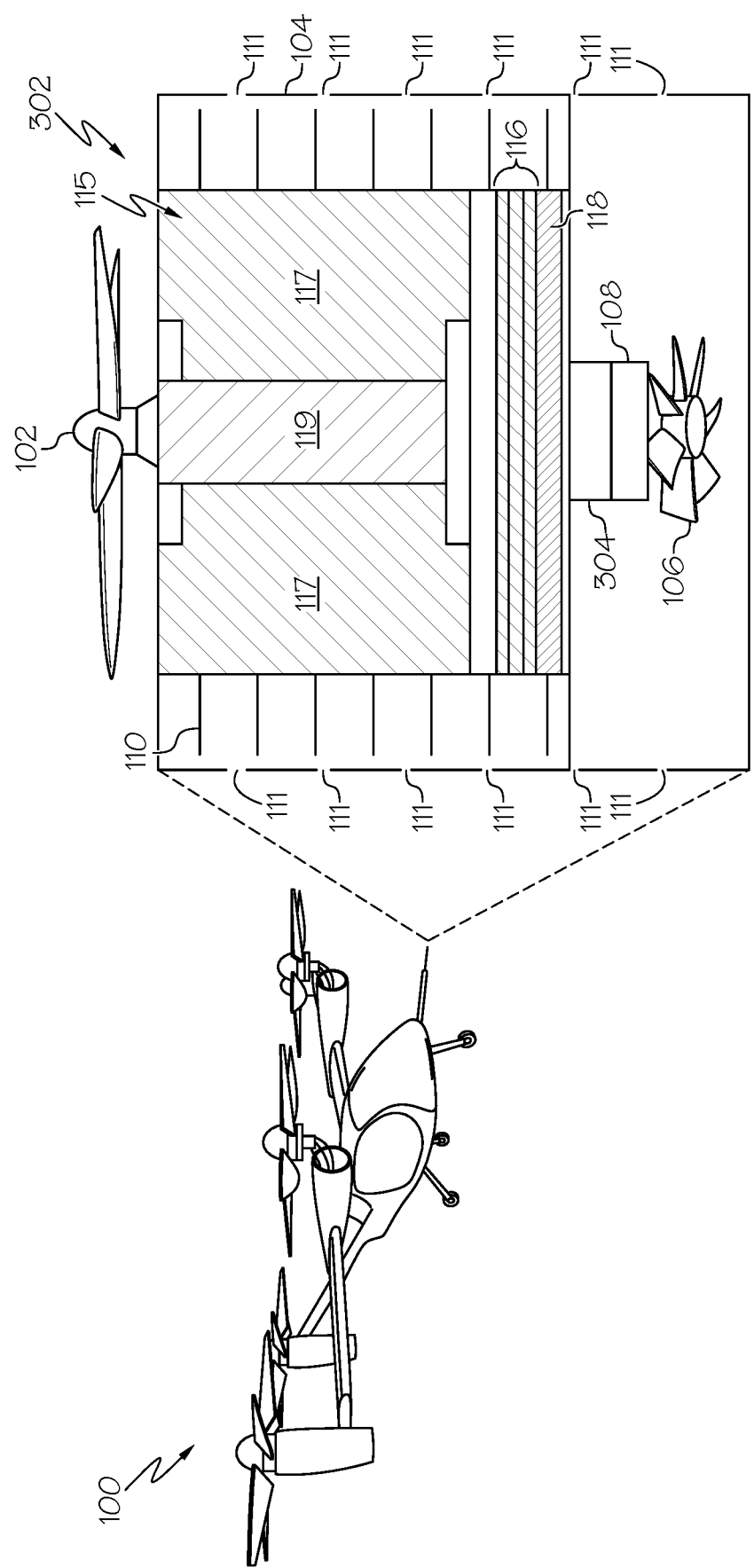
FIG. 3B depicts an example operation of the propeller and auxiliary fan of an eVTOL vehicle operating in a dual cooling mode, according to one or more embodiments described and illustrated herein.

FIG. 3B depicts an example operation of the eVTOL vehicle 100 when the eVTOL takes off from the source location 204, e.g., landing pad or helipad, and is preparing to land in the destination location 206. In embodiments, as stated above, the operating temperatures of the power electronics devices 116 are particularly high during specific operations of the eVTOL vehicle 100, e.g., during a hovering operation, take-off operation, and landing operation of the eVTOL vehicle 100. During these operations, rapid cooling will help ensure that the power electronics devices 116 are not damaged. To enable this rapid cooling, the clutch engages auxiliary fan 106, automatically and without user intervention, with the rotor 119, which is also coupled to the propeller 102, such that the auxiliary fan 106 may be configured to rotate at a particular frequency as a direct result of the rotation of the propeller 102. It is noted that, in embodiments, upon the eVTOL vehicle 100 sensing operating temperatures of the power electronics devices 116 satisfying or exceeding particular threshold temperatures, the eVTOL vehicle 100 may automatically initiate, via the controller 118 of the eVTOL vehicle 100, operation of the dual cooling mode. In other embodiments, it is noted that the dual cooling mode may also be automatically activated upon the controller 118 receiving data relating to power consumption, which exceeds particular power threshold values.

As stated, the inlets 111 positioned on the exterior of enclosure 104 may be utilized to channel the air generated by the propeller 102 into the enclosure 104. The air may contact the power electronics devices 116 and the controller 118 within the enclosure 104 in addition to various other portions, e.g., the stator 117, the rotor 119, and so forth. In contrast with the dotted lines 302 of FIG. 3A, the solid lines 304 in FIG. 3B indicate a connection or mechanical coupling of the clutch to the rotor 119, which is also coupled to the propeller 102. In particular, the solid lines 304 indicate that the auxiliary fan 106 is engaged with or mechanically coupled to the propeller 102, e.g., via the rotor 119, and is configured to rotate at a predefined speed based on the rotation speed of the propeller 102.

It is noted that during take-off and landing of the eVTOL, the rotation speed of the propeller 102 is low, as the eVTOL is starting operation from an "off" position or state to an "on" state. As such, the propeller 102 may take a particular amount of time to reach a certain rotation speed and enable the eVTOL to take off, e.g., 30 seconds, 45 seconds, 1 minute, and so forth. During this period of transition, the operating temperatures of the stator 117, rotor 119, and the power electronics devices 116 may reach very high temperatures, and as such, in order to ensure operational longevity and accurate functioning of the eVTOL vehicle 100, the controller 118 may activate the dual cooling mode operation. As a result of which, as stated above, the clutch may mechanically couple the stator 117 with the auxiliary fan 106, as a result of which the rotation of the auxiliary fan 106 may be controlled by or linked to the movement of the propeller 102, as the propeller 102 is disposed on or positioned on a top portion of the rotor 119. A rotation of the auxiliary fan 106 may be initiated, e.g., at a rate that is higher than the rate of rotation of the propeller 102, e.g., at least for a particular time frame. Due to the higher rate of rotation of the auxiliary fan 106 relative to the propeller 102, the air generated by the auxiliary fan 106 may effectuate cooling of the stator, rotor, and various other components within the enclosure 104.

FIG. 4 depicts a non-limiting example of the controller 118 that is configured to perform one or more of the features and functionalities described in the present disclosure, according to one or more embodiments described and illustrated herein. As illustrated, the controller 118 includes a processor 406, input/output hardware 408, a network interface hardware 410, a data storage component 412, and memory 402. The memory 402 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable media may reside within the computing device and/or a device that is external to the controller 118.

The memory 402 may store operating instructions 403, each of which may be embodied as a computer program, firmware, and so forth. The memory 402 may comprise RAM, ROM, flash memories, hard drives, or any device capable of storing the operating instructions 403 such that the operating instructions 403 can be accessed by the processor 406. The operating instructions 403 may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the memory 402. Alternatively, the operating instructions 403 may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The processor 406 along with the memory 402 may operate as a controller for the controller 118.

A local interface 404 is also included in FIG. 1 and may be implemented as a bus or other communication interface to facilitate communication among the components of the controller 118. The processor 406 may include any processing component operable to receive and execute operating instructions 403 from the memory 402 (such as from a data storage component 412 and/or the memory 402). Accordingly, the 406 may be an integrated circuit, a microchip, a computer, or any other computing device. As described above, the input/output hardware 408 may include and/or be configured to interface with speakers, microphones, and/or other input/output components.

The operating instructions 403 may include an operating system and/or other software for managing components of the controller 118. It should be understood that while the component in FIG. 1 are illustrated as residing within the controller 118, this is merely an example. In some embodiments, one or more of the components may reside external to the controller 118 or within other devices. It should be understood that, while the controller 118 is illustrated as a single device, this is also merely an example. As an example, one or more of the functionalities and/or components described herein may be provided by the controller 118. Depending on the particular embodiments, any of these device may have similar components as those depicted in FIG. 1. To this end, any of these devices may include instructions for performing the functionality described herein.

It should now be understood that the embodiments of the present disclosure are directed to a hybrid cooling system of an electronic machine. The auxiliary fan based hybrid cooling system comprises a propeller positioned on an exterior portion of an enclosure, at least one electronic component and an auxiliary fan disposed within the enclosure, and wherein in a single cooling mode the propeller rotates to generate air that is channeled into the enclosure, in a dual cooling mode: the propeller rotates to generate the air that is channeled into the enclosure, a coupling mechanism simultaneously engages the propeller and the auxiliary fan and couples the propeller to the auxiliary fan, and the auxiliary fan, coupled to the propeller via the coupling mechanism, rotates responsive to the rotation of the propeller in the dual cooling mode. In embodiments, a hybrid cooling system of an electric machine comprises a propeller positioned on exterior portions of an enclosure, at least one electronic component and an auxiliary fan disposed within the enclosure, and wherein in a dual cooling mode, the propeller rotates to generate air that is channeled into the enclosure, a coupling mechanism simultaneously engages the propeller and the auxiliary fan and couples the propeller to the auxiliary fan, and the auxiliary fan, coupled to the propeller via the coupling mechanism, rotates responsive to the rotation of the propeller in the dual cooling mode.

In a first aspect, a hybrid cooling system of an electric machine comprises a propeller positioned on an exterior portion of an enclosure and mechanically coupled to a rotor, at least one electronic component, a stator, the rotor, and an auxiliary fan disposed within the enclosure, and wherein in a single cooling mode, the propeller rotates to generate air that is channeled into the enclosure, in a dual cooling mode the propeller rotates to generate the air that is channeled into the enclosure, a coupling mechanism simultaneously engages the rotor and the auxiliary fan and links the propeller to the auxiliary fan by the engaging of the rotor with the auxiliary fan, and the auxiliary fan, rotates responsive to the rotation of the propeller in the dual cooling mode.

In a second aspect, the hybrid cooling system of the first aspect, wherein the electric machine is an eVTOL vehicle.

In a third aspect, the hybrid cooling system of the second aspect, wherein the single cooling mode is activated during a cruise mode in which the eVTOL vehicle is airborne and traveling at a predefined speed.

In a fourth aspect, the hybrid cooling system of any of the first to the third aspects, wherein in the single cooling mode, the auxiliary fan operates independent of and is decoupled from the rotor.

In a fifth aspect, the hybrid cooling system of the second aspect, wherein the dual cooling mode is activated during at least one of a take-off operation and a landing operation of the eVTOL vehicle.

In a sixth aspect, the hybrid cooling system of the fourth aspect, wherein in the single cooling mode, the auxiliary fan generates electricity from the air generated by the propeller.

In a seventh aspect, the hybrid cooling system of any of the first to the sixth aspects, wherein the enclosure further includes a plurality of temperatures sensors disposed therein for determining, in real time, a temperature associated with each of the at least one electronic component, the stator, and the rotor.

In an eighth aspect, the hybrid cooling system of any of the first to the seventh aspects, wherein the at least one electronic component is a power electronics device disposed within the enclosure.

In a ninth aspect, the hybrid cooling system of the eight aspect, further includes a plurality of power sensors disposed therein for determining, in real time, power consumption data associated with the power electronics device.

In a tenth aspect, the hybrid cooling system of any of the first to the ninth aspects, wherein the coupling mechanism is a clutch.

In a eleventh aspect, the hybrid cooling system of any of the first to the tenth aspects, wherein the air generated by the propeller rotating is channeled into the enclosure via inlets disposed on the exterior portion of the enclosure, and the auxiliary fan rotates responsive to the rotation of the propeller for generating additional air that is channeled into the enclosure via inlets that are disposed on the exterior portion of the enclosure.

In a twelfth aspect, a hybrid cooling system of an electric machine comprises a propeller positioned on an exterior portion of an enclosure and mechanically coupled to a rotor, at least one electronic component, a stator, the rotor, and an auxiliary fan disposed within the enclosure, and wherein in a dual cooling mode the propeller rotates to generate the air that is channeled into the enclosure, a coupling mechanism simultaneously engages the rotor and the auxiliary fan and links the propeller to the auxiliary fan by the engaging of the rotor with the auxiliary fan, and the auxiliary fan, rotates responsive to the rotation of the propeller in the dual cooling mode.

In a thirteenth aspect, a hybrid cooling system of the twelfth aspect, wherein the electric machine is a component of an eVTOL vehicle.

In a fourteen aspect, a hybrid cooling system of the thirteenth aspect, wherein the electric machine operates in a single cooling mode, the single cooling mode is activated during a cruise mode in which the eVTOL vehicle is airborne and traveling at a predefined speed.

In a fifteenth aspect, a hybrid cooling system of the fourteenth aspect, wherein in the single cooling mode, the auxiliary fan operates independent of and decoupled from the rotor and the propeller for generating electricity from the air that is generated by the propeller.

In a sixteenth aspect, a hybrid cooling system of the thirteenth aspect, wherein the dual cooling mode is activated during at least one of a take-off operation and a landing operation of the eVTOL vehicle.

In a seventeenth aspect, a hybrid cooling system of any of the twelfth to the sixteenth aspects, wherein the at least one electronic component is a power electronics device disposed within the enclosure.

In an eighteenth aspect, a hybrid cooling system of the seventeenth aspect, further includes a plurality of power sensors disposed therein for determining, in real time, power consumption data associated with the power electronics device.

In a nineteenth aspect, a hybrid cooling system of any of the twelfth to the eighteenth aspects, wherein the coupling mechanism is a clutch.

In a twentieth aspect, a hybrid cooling system of any of the twelfth to the nineteenth aspects, wherein the air generated by the propeller rotating is channeled into the enclosure via inlets disposed on the exterior portion of the enclosure, and the auxiliary fan rotates responsive to the rotation of the propeller for generating additional air that is channeled into the enclosure via inlets that are disposed on the exterior portion of the enclosure.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A hybrid cooling system of an electric machine, comprising:
    a propeller positioned on an exterior portion of an enclosure and mechanically coupled to a rotor;
    at least one electronic component, a stator, the rotor, and an auxiliary fan disposed within the enclosure; and
    wherein:
        in a single cooling mode, the propeller rotates to generate air that is channeled into the enclosure;
        in a dual cooling mode:
            the propeller rotates to generate the air that is channeled into the enclosure,
            a coupling mechanism simultaneously engages the rotor and the auxiliary fan and links the propeller to the auxiliary fan by the engaging of the rotor with the auxiliary fan, and
            the auxiliary fan, rotates responsive to the rotation of the propeller in the dual cooling mode.

2. The hybrid cooling system of claim 1, wherein the electric machine is an eVTOL vehicle.

3. The hybrid cooling system of claim 2, wherein the single cooling mode is activated during a cruise mode in which the eVTOL vehicle is airborne and traveling at a predefined speed.

4. The hybrid cooling system of claim 1, wherein in the single cooling mode, the auxiliary fan operates independent of and is decoupled from the rotor.

5. The hybrid cooling system of claim 2, wherein the dual cooling mode is activated during at least one of a take-off operation and a landing operation of the eVTOL vehicle.

6. The hybrid cooling system of claim 4, wherein in the single cooling mode, the auxiliary fan generates electricity from the air generated by the propeller.

7. The hybrid cooling system of claim 1, wherein the enclosure further includes a plurality of temperatures sensors disposed therein for determining, in real time, a temperature associated with each of the at least one electronic component, the stator, and the rotor.

8. The hybrid cooling system of claim 1, wherein the at least one electronic component is a power electronics device disposed within the enclosure.

9. The hybrid cooling system of claim 8, further includes a plurality of power sensors disposed therein for determining, in real time, power consumption data associated with the power electronics device.

10. The hybrid cooling system of claim 1, wherein the coupling mechanism is a clutch.

11. The hybrid cooling system of claim 1, wherein
    the air generated by the propeller rotating is channeled into the enclosure via inlets disposed on the exterior portion of the enclosure; and
    the auxiliary fan rotates responsive to the rotation of the propeller for generating additional air that is channeled into the enclosure via inlets that are disposed on the exterior portion of the enclosure.

12. A hybrid cooling system of an electric machine comprising:
    a propeller positioned on an exterior portion of an enclosure and mechanically coupled to a rotor;
    at least one electronic component, a stator, the rotor, and an auxiliary fan disposed within the enclosure; and
    wherein in a dual cooling mode:
        the propeller rotates to generate the air that is channeled into the enclosure,
        a coupling mechanism simultaneously engages the rotor and the auxiliary fan and links the propeller to the auxiliary fan by the engaging of the rotor with the auxiliary fan, and
        the auxiliary fan, rotates responsive to the rotation of the propeller in the dual cooling mode.

13. The hybrid cooling system of claim 12, wherein the electric machine is a component of an eVTOL vehicle.

14. The hybrid cooling system of claim 13, wherein the electric machine operates in a single cooling mode, the single cooling mode is activated during a cruise mode in which the eVTOL vehicle is airborne and traveling at a predefined speed.

15. The hybrid cooling system of claim 14, wherein in the single cooling mode, the auxiliary fan operates independent of and decoupled from the rotator and the propeller for generating electricity from the air that is generated by the propeller.

16. The hybrid cooling system of claim 13, wherein the dual cooling mode is activated during at least one of a take-off operation and a landing operation of the eVTOL vehicle.

17. The hybrid cooling system of claim 12, wherein the at least one electronic component is a power electronics device disposed within the enclosure.

18. The hybrid cooling system of claim 17, further includes a plurality of power sensors disposed therein for determining, in real time, power consumption data associated with the power electronics device.

19. The hybrid cooling system of claim 12, wherein the coupling mechanism is a clutch.

20. The hybrid cooling system of claim 12, wherein
the air generated by the propeller rotating is channeled into the enclosure via inlets disposed on the exterior portion of the enclosure; and the auxiliary fan rotates responsive to the rotation of the propeller for generating additional air that is channeled into the enclosure via inlets that are disposed on the exterior portion of the enclosure.

* * * * *